United States Patent Office 3,451,327
Patented June 24, 1969

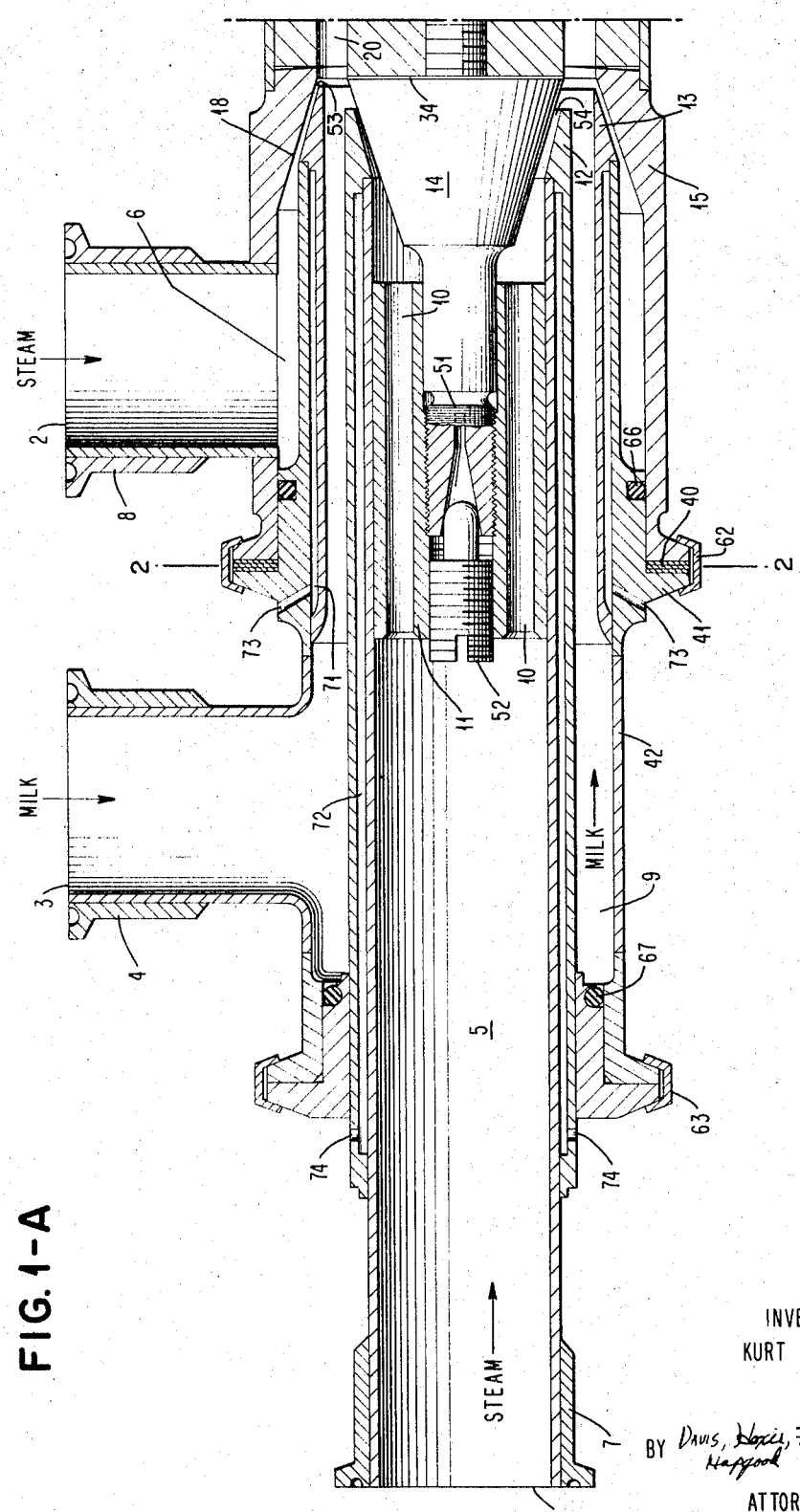

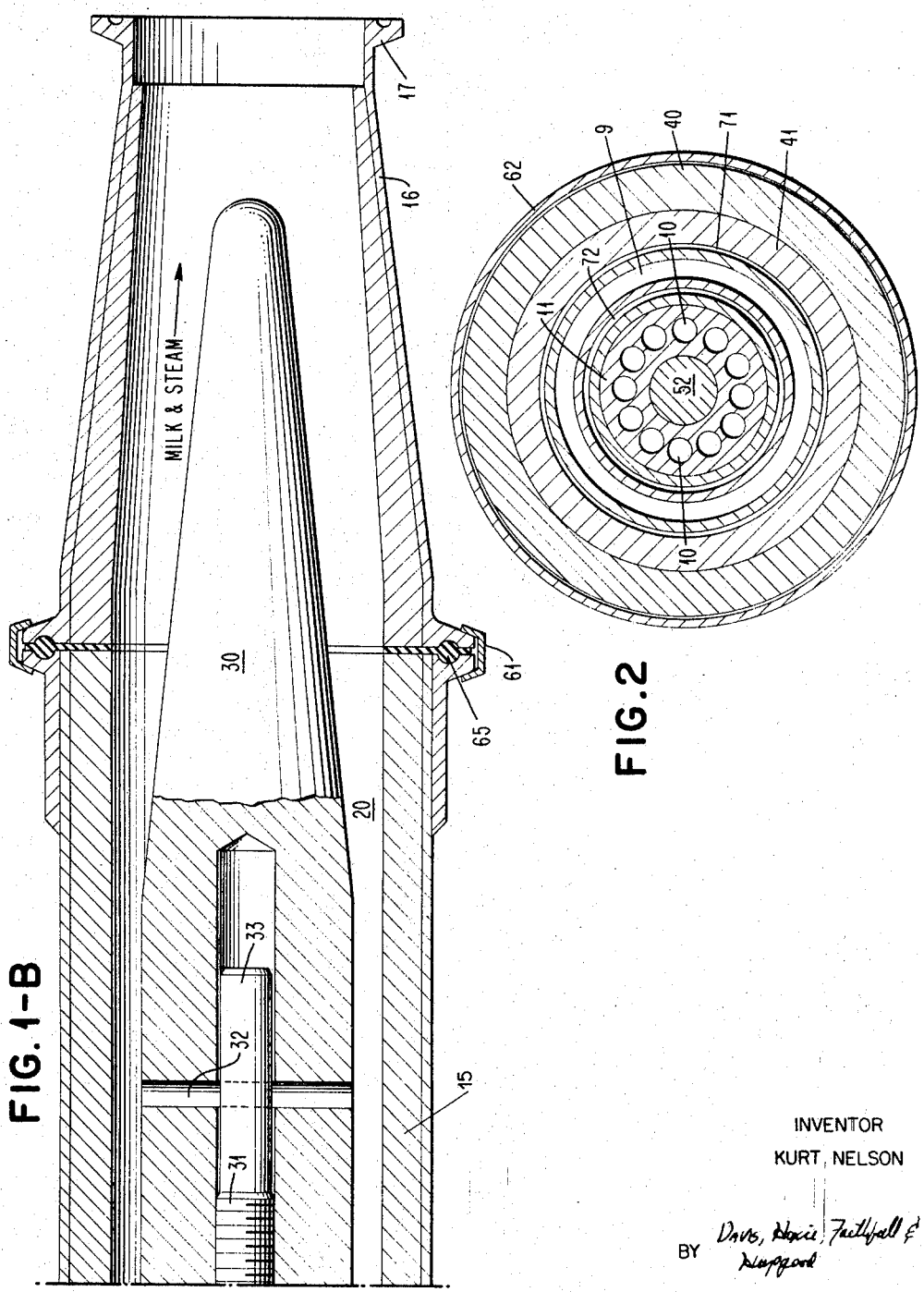

---

3,451,327
STEAM INJECTOR FOR A MILK STERILIZER
Kurt Nelson, Wappingers Falls, N.Y., assignor to The De Laval Separator Company, Poughkeepsie, N.Y., a corporation of New Jersey
Filed Sept. 20, 1965, Ser. No. 488,463
Int. Cl. B65b 55/06; B05b 7/02; B01f 3/04
U.S. Cl. 99—251               9 Claims

ABSTRACT OF THE DISCLOSURE

The milk to be sterilized flows through a passage of annular cross-section while steam flows in the same direction through a passage of annular cross-section surrounding the milk passage and also through a passage within the annular milk passage; and at the discharge end of each passage is an annular orifice so that the annular stream of discharging milk is merged with both interior and exterior annular streams of steam. The two annular orifices for discharging steam are adjustable to regulate the steam flow, and an air space separates the annular milk passage from each steam passage. The mixture of milk and condensing steam flows from the discharge orifices through a passage which gradually increases in cross-sectional area.

---

This invention relates to an improved steam injector for use in heat sensitive liquid sterilization apparatus such as that shown in U.S. Patent No. 3,101,041 issued Aug. 20, 1963 to Hallstrom.

The Hallstrom apparatus is primarily used for sterilization of milk by rapidly raising the temperature of the milk to around 300° F. for a brief time and then rapidly lowering the temperature in a vacuum chamber. The temperature and the holding time at that temperature are critical to the preservation of flavor and to effecting complete sterilization. Heat transfer means are too slow and tend to accumulate milk solids. Steam injectors therefore are used. The steam is injected into the milk in a turbulent mix to rapidly raise the temperature of the milk. The water thus added is extracted from the milk in the vacuum chamber which is used to rapidly cool the milk.

A conventional venturi steam injector will not operate for a sufficient length of time due to a buildup of milk solids in the injector. The temperatures involved are well above that at which casein and other milk solids precipitate. The buildup of milk solids in a conventional steam injector eventually restricts the flow of milk and requires shut down of the apparatus.

All food processing equipment must be capable of disassembly for periodic cleaning to meet sanitary requirements. Reassembly without disturbance of adjustments is desirable.

An objective of the present invention is to provide a steam injector which does not become blocked by milk solids.

Another objective of the present invention is to provide an injector which may be disassembled and reassambled without affecting any adjustments.

Another objective of the present invention is to provide a method of steam injection sterilization of liquids which method prevents solids from accumulating.

In accordance with these objectives, I have provided a triple path concentric steam injector which may be disassembled to expose all milk contacting surfaces, and reassembled without disturbing any critical dimensions.

In the drawings, FIGURES 1–A and 1–B taken together are a cross-sectional view of the steam injector of the present invention.

FIGURE 2 is a section along the line 2—2 of FIGURE 1.

In the drawings steam inlets 1 and 2 are equipped with standard flanges 7 and 8 respectively. The steam travels from inlet 1 through passage 5 and through bores 10 in body 11 to an inner injector circumferential orifice 54 formed by adjustable clearance between cone 14 and lip 12.

The steam from inlet 2 travels through annular passage 6 to an outer injector circumferential orifice 53 formed by an adjustable clearance between lip 13 and housing 15.

The flow of steam is regulated by these orifices and is critical to temperature control.

Adjustment of steam flow for the outer steam injector ring is made by shims 40 between housing 15 and a flange 41 on the outer shell 42 of milk passage 9. Adding shims 40 increases the clearance between conical shoulder 18 on housing 15 and lip 13.

Adjustment of steam flow for the inner steam injector ring is made by screwing cone 14 in or out of body 11 by means of threaded portion 51 of cone 14. The adjustment threads 51 are locked by set screw 52.

The milk flows from inlet 3 also having a standard flange 4, through an annular passage 9. The flowing annulus of milk meets steam from the inner and outer injector rings simultaneously. The steam from the inner and outer rings sheaths the annulus of moving milk momentarily and then mixes with the milk to raise the milk to the proper temperature. The milk and steam move along passage 20 defined by the housing 15 and tapered plug 30. The now hot milk and steam move through the injector housing extension 16 and flange 17 into a holding tube several feet long. The holding tube is not shown. The time during which the milk is held at the high temperature is dictated by the length of the holding tube and the flow velocity. The temperature is lowered and the excess water extracted in a vacuum chamber as is explained in the Hallstrom patent.

Air spaces 71 and 72 insulate steam passages 5 and 6 from the milk passage 9 to prevent unwanted pre-heat and possible solids precipitation in the milk as it flows through passage 9 toward the injector orifice rings. Air spaces 71 and 72 are vented to the atmosphere by multiple vent holes 73 and 74 respectively. These vent holes permit boil off of any liquid trapped in the air spaces during cleaning and permit access for sanitary cleaning of the air spaces.

Tapered plug 30 is threaded onto the face of cone 14 by means of threaded portion 31 of stud 33 and pinned in place by drift pin 32. Cone 14 has a cylindrical chamfer 34 which reduces erosion of the joint between the cone 14 and plug 30.

The injector is disassembled for periodic sanitary cleaning by removing it from the system by decoupling at flanges 4, 8, 7 and 17. The injector is then disassembled by removing quick disconnect clamps 61, 62, and 63 to separate extension 16, housing 15, and permit withdrawal of steam tube 5 along with body 11 bearing cone 14 and tapered plug 30. All milk contacting surfaces are now exposed for cleaning. O-ring seals 65, 66 and 67 permit leakproof reassembly.

No disassembly of any relatively adjustable elements is necessary to expose all surfaces for cleaning.

The inner orifice 54 remains fully assembled as part of the inner assembly of passage 5, body 10, cone 14 and plug 30. The outer orifice 53 is disassembled but the adjustment is fixed by shims. Thus upon reassembly all critical clearances in the injector orifice rings will be undisturbed.

It will be apparent that many modifications may be made within the scope and spirit of my invention and, accordingly I do not wish to be limited otherwise than as indicated by the terms of the appended claims.

I claim:

1. In a liquid sterilization apparatus, the combination of means defining three separate passages, namely, first and second passages each having a generally annular cross-section, said second passage surrounding said first passage, and a third passage surrounded by said first passage, said means also defining three generally annular discharge orifices at corresponding ends of the respective passages, means for supplying steam to said second and third passages, and means for supplying the liquid to be sterilized to said first passage, whereby steam is discharged through said orifices of the second and third passages in streams surrounding and surrounded by, respectively, the annular stream of said liquid discharged through said orifice of the first passage.

2. The combination according to claim 1, in which said passage defining means also define a heat insulating air space interposed between said first passage and each of said second and third passages.

3. The combination according to claim 1, comprising also means for adjusting the steam flow through at least one of the discharge orifices of said second and third passages.

4. The combination according to claim 3, in which said adjusting means include means for adjusting the size of at least one of said discharge orifices of the second and third passages.

5. The combination according to claim 1, in which said annular steam orifices of the second and third passages are inclined toward said annular stream of liquid discharge from said orifice of the first passage.

6. The combination according to claim 1, comprising also means defining an outlet passage extending from said discharge orifices for conveying therefrom the product of mixing said streams of liquid and steam, said outlet passage having a portion which increases in throughflow area in the direction of said conveying.

7. The combination according to claim 1, in which said passage defining means include a plurality of subassemblies and quick-disconnect couplings holding said subassemblies together, said couplings being operable to release the subassemblies from each other for cleaning.

8. A steam injector apparatus for a milk sterilization system, said injector apparatus including an annular milk passage, an inner steam passage and an outer concentric steam passage, an adjustable inner steam injector orifice defined by a lip termination of the inner steam passage and a movable conical plug, an adjustable outer steam injector orifice defined by a lip termination of the inner wall of the outer steam passage and an adjustable conical inside shoulder on the outer wall of the outer steam passage, said movable conical plug having a threaded extension to permit adjustment of the inner orifice clearance, said conical inside shoulder being longitudinally adjustable with respect to said outer steam passage lip by means of shims.

9. The steam injector apparatus as claimed in claim 8 wherein an air space separates each steam passage from the milk passage.

References Cited

UNITED STATES PATENTS

| | | | |
|---|---|---|---|
| 2,959,561 | 11/1960 | Kelley | 259—4 XR |
| 3,207,485 | 9/1965 | Warren | 259—4 |
| 3,219,483 | 11/1965 | Goos et al. | 259—4 XR |
| 3,298,669 | 1/1967 | Zingg | 259—4 |
| 1,839,952 | 1/1932 | Daily | 261—76 XR |
| 2,022,420 | 11/1935 | Hammer et al. | |
| 2,060,557 | 11/1936 | Davis | 99—251 XR |
| 2,682,827 | 7/1954 | Gressly | 99—251 |
| 2,737,374 | 3/1956 | Terrett | 99—251 XR |
| 2,801,087 | 7/1957 | Hawk | 99—251 XR |
| 2,905,543 | 9/1959 | Schreter et al. | 261—76 XR |
| 2,909,985 | 10/1959 | Abrams | 99—251 |

FOREIGN PATENTS

| | | |
|---|---|---|
| 731,894 | 6/1955 | Great Britain. |
| 759,990 | 10/1956 | Great Britain. |

WALTER A. SCHEEL, *Primary Examiner.*

JOHN M. NEARY, *Assistant Examiner.*

U.S. Cl. X.R.

99—216; 259—4; 261—76